United States Patent [19]

Bridges

[11] Patent Number: 5,745,157
[45] Date of Patent: Apr. 28, 1998

[54] DIGITAL PRINTER WITH SUPPORT SHOE AND TRANSLATABLE MEDIA GUIDE MEMBER THEREIN

[75] Inventor: Mark E. Bridges, Rochester, N.Y.

[73] Assignee: Eastman Kodak Company, Rochester, N.Y.

[21] Appl. No.: 371,241

[22] Filed: Jan. 11, 1995

[51] Int. Cl.⁶ .................... B41J 2/435; G01D 15/24; H01S 1/131; G11B 7/00
[52] U.S. Cl. .................................. 347/262; 347/264
[58] Field of Search .................... 347/225, 224, 347/231, 263, 241, 242, 259, 260, 264

[56] References Cited

U.S. PATENT DOCUMENTS

| | | | |
|---|---|---|---|
| 1,746,407 | 2/1930 | Schroter et al. | 347/258 |
| 2,511,892 | 6/1950 | Wise | 358/296 |
| 3,823,276 | 7/1974 | Maslowski et al. | 347/241 |
| 3,925,607 | 12/1975 | Hauber | 358/491 |
| 3,958,250 | 5/1976 | Rolon | 347/262 |
| 4,260,997 | 4/1981 | Fukui | 347/242 |
| 4,260,998 | 4/1981 | Fukui | 247/262 |
| 4,293,864 | 10/1981 | Scott | 247/262 |
| 4,334,770 | 6/1982 | Landsman | 347/264 |
| 4,479,133 | 10/1984 | Shiozawa et al. | 347/242 |
| 4,479,148 | 10/1984 | Sheck et al. | 358/492 |
| 4,595,957 | 6/1986 | Holthusen | 358/491 |
| 4,678,312 | 7/1987 | Shiozawa et al. | 347/225 |
| 4,686,541 | 8/1987 | Rosier | 347/262 |
| 4,698,647 | 10/1987 | Gerlach | 347/257 |
| 4,816,923 | 3/1989 | Saotome | 358/494 |
| 5,097,351 | 3/1992 | Kramer | 359/17 |
| 5,101,223 | 3/1992 | Boeve | 347/264 |
| 5,214,528 | 5/1993 | Akanabe et al. | 359/211 |

*Primary Examiner*—N. Le
*Assistant Examiner*—Raquel Y. Gordon
*Attorney, Agent, or Firm*—Milton S. Sales

[57] ABSTRACT

A printer has (1) a support shoe with a cylindrical inner surface and (2) a write head carried by a rotor which is simultaneously rotatable about and linearly translated along the axis of the cylindrical surface. A media guide member is mounted for movement along the axis of rotation of the rotor. The media guide member is moved to a position within the cylindrical inner surface of the support shoe so as to form a gap between the inner surface of the support shoe and the outer surface of the media guide member. The recording media can advance around a gap formed between the outer surface of the media guide member and inside of the cylindrical inner surface of the support shoe. The rotor is carried by a rotor support member in fixed spacial relationship to the media guide member for simultaneous linear translation along the axis of rotation of the rotor. The rotor support member is attached to a carriage assembly which is supported for movement along a pair of guide rods.

8 Claims, 7 Drawing Sheets

DIGITAL PRINTER WITH SUPPORT SHOE AND TRANSLATABLE MEDIA GUIDE MEMBER THEREIN

CROSS-REFERENCE TO RELATED APPLICATIONS

Reference is made to commonly assigned, U.S. patent application Ser. No. 08/123,838 entitled LEADSCREW COUPLER, filed in the names of Jadrich et al. on Sep. 20, 1993, now U.S. Pat. No. 5,392,662; Ser. No. 08/123,839 entitled METHOD AND APPARATUS FOR EXPOSING PHOTOSENSITIVE MEDIA WITH MULTIPLE LIGHT SOURCES, filed in the names of Smith et al. on Sep. 20, 1993; Ser. No. 08/371,346 entitled PRINTER WITH SUPPORT SHOE AND MEDIA METERING THEREIN, filed concurrently herewith in the name of Mark E. Bridges; and Ser. No. 08/371,347 entitled PRINTER WITH SUPPORT SHOE AND EXIT MEDIA GUIDE MEMBER, filed concurrently herewith in the name of Mark E. Bridges.

BACKGROUND OF THE INVENTION

1. Technical Field

The present invention relates generally to film printers utilizing digitized signals, and more particularly to photographic printers that form media into a cylindrical shape for exposure by a rotating light source.

2. Background Art

Photographic printing of digitized images is accomplished by modulating the intensity of a light beam that forms a writing spot on photosensitive media as the beam moves relative to the photosensitive media. One type of printer uses an array of light emitting diodes (LED's) positioned on a rotor which spins within a media support cylinder. The rotor is axially translated through the support cylinder to index the LED array to the next image line or lines. The light emitting diodes can be directly modulated with relatively simple electronic drive circuitry, and can be employed with relatively inexpensive, compact and reliable hardware.

Commonly assigned, co-pending U.S. patent application Ser. No. 08/123,839, filed in the name of Smith et al. on Sep. 20, 1993, discloses a high speed printer capable of producing full color images on conventional photographic paper using digitized information and employing simple and inexpensive light sources. A write head assembly includes a plurality of individually addressable mono-color LED's arranged in columns and rows to emit a plurality of light beams, projection optics, and support electronics. The write head assembly is resident on a rotor which is simultaneously rotated about a fixed axis and linearly translated past stationary photosensitive recording media mounted on the inner surface of a cylindrical "support shoe" to form a plurality of writing spots moving across the photosensitive material in a fast scan direction and in a slow scan direction. The disclosure of the Smith et al patent is hereby specifically incorporated herein by reference.

When using a printer as disclosed in said U.S. patent application Ser. No. 08/123,839, the photosensitive recording media must be advanced into the support shoe without scratching, and accurately positioned relative to the exposure source while the rotating exposure source traverses the axial length of the cylindrical support shoe. Numerous methods have evolved for manipulating the media relative to the cylindrically formed support shoe during the printing operation.

In U.S. Pat. No. 2,511,892, which issued to Wise on Jun. 20, 1950, the end of a roll is fed through a single-turn drive roller pair. The media is driven between a pair of mandrels and a flexible sheet. The flexible sheet opens and closes about the mandrels, sandwiching the media to the mandrels. A data transfer operation takes place on the exposed portion of media. The flexible sheet is opened after the writing operation and media is driven past a knife, which cuts off a sheet portion from the roll. The flexible sheet is closed over the unexposed media which is still loosely held between the mandrels and the flexible sheet for the next write operation. The use of support mandrels reduces the area of exposable media, increasing waste. If photographic media is used, trapping the media between a mandrel and the flexible sheet can cause emulsion damage at the edge of the media when it is transported into and out of the printer when the flexible sheet is in the open state.

U.S. Pat. No. 3,958,250, which issued to Rolon on May 18, 1976, discloses a printer in which the end of a roll of film is driven into a curved entrance guide shoe. The shoe diverts the film along a curved wall housed within an exposure compartment. When the end of the film has reached the opposite side of the curved wall, a vacuum holds the film to the wall. Forcing the emulsion side of the media against a fixed, curved entrance shoe risks scratches to that emulsion.

U.S. Pat. No. 4,479,148, which issued to Sheck et al. on Oct. 23, 1984, teaches the use of a transport upon which is taped a flap which retains an exposure or reading medium in sheet form for newspaper printing apparatus. The transport is urged into registration with rotatable mandrels by means of drive rollers. As the mandrels rotate, the transport fills a gap between the mandrels and a curved wall until the transport is cylindrical in form. The media sheets are loaded by hand, necessitating a dark environment for photographic use. A use of a full width roller carries the danger of scratching the emulsion U.S. Pat. No. 4,686,541, which issued to Rosier on Aug. 11, 1987, discloses extracting film from a reel with a first set of drive rollers, guiding the film along its edge into a cylindrical support, cutting it, holding the film to a cylindrical cradle with a vacuum, exposing it, engaging another set of rollers (which move out of the paper path when supplying paper to the cradle) to drive the film out of the cradle into yet another set of rollers which drives the sheet into a storage cassette. A take-up roll may be used when it is inappropriate to cut the film into sheets. A fixed sheet size is used, limiting the printer's efficient use of media when doing small images. Passing the media segment from roller pair to roller pair and edge guiding the media in the manner prescribed can result in damage to the edge if frictional properties between the rollers and the media change due to humidity, and the substrate/emulsion composition of different media.

In U.S. Pat. No. 4,698,647, which issued to Gerlach on Oct. 6, 1987, the end of a roll of film is fed into a pair of foam covered rollers, around sheet metal deflector guides, up and around two axially adjustable non-rotating mandrels, back through another set of deflector guides and out to another set of foam covered rollers. The mandrels move axially to accommodate different film widths. The rotor/hub sandwich is translated the axial length of the curved film. A film guide cap helps direct the film around the mandrels during the initial loading of film. The mandrels reduce the amount of exposable media. Additional film waste occurs at the ends near the mandrels because travel of the carriage-mounted hub arrangement is limited by the placement and structure of the mandrels. Although the guides and hubs are chromed, an unacceptable level of scratching will undoubtedly occur during film transport and carriage translation.

U.S. Pat. No. 4,816,923, filed by Saotome on Mar. 28, 1989, discloses a scanning device that uses drive rollers to feed a sheet into a cylindrical support. An edge guide at each end of the cylindrical support, spaced to allow insertion of the sheet, steers the sheet until it encounters a stop. Driving the media with a roller pair and edge guiding it downstream of the rollers in the manner prescribed can result in damage to the media due to misalignment of the rollers relative to the edge guides as taught by exact constraint principles. Damage can also occur if frictional properties between the rollers and the media change due to humidity or another type of media is used that has a different thickness or substrate/emulsion composition. All media have the property of beam stiffness. When media is forced up to the type of stop disclosed, a short portion at the end of the media will remain straight, that is, will not follow the curvature of the cylindrical support. The length of the straight portion is dependent upon the tangential force exerted by the drive rollers, the stiffness of the media, radius of intended curvature, and the co-efficient of friction between the media and the support. As the straight portion is no longer in intimate contact with the support, it will have an out-of-focus condition unless the optics have an extremely long depth of focus. Long depth of focus focal systems tend to operate slower than those with shallow depth of focus. System performance is therefore diminished utilizing the method described. If the portion of media adjacent the stop is not used because of the beam stiffness problem, waste occurs. Also, the media edge abutting the stop can be damaged if the force exerted by the rollers is too high. Conversely, roller slippage will occur if nip force is too light, causing both abrasive damage to the media emulsion and inaccurate registration.

DISCLOSURE OF THE INVENTION

It is an object of the present invention to provide improved means for accurately registering and metering light sensitive recording media within a cylindrically-formed support for scan printing.

It is another object of the present invention to provide a method and apparatus for guiding light sensitive recording media into a cylindrical support shoe wherein an exposure plane is held at a prescribed radius.

It is a further object of the present invention to provide a method and apparatus for maximizing the exposure area of media and to eliminate boarders by allowing a rotor carrying illumination means to translate the entire axial length of the cylindrically-formed media.

It is still a further object of the present invention to provide a method and apparatus for minimizing the occurrence of edge damage and scratches or abrasions to the emulsion of the media by minimizing the number of hard, stationary objects used to guide or deflect the media.

It is yet a further object of the present invention to provide a method and apparatus for minimizing the effect of core set and beam stiffness to the media transport and printing operations by guiding the media into a cylindrical space created by the support member and a rotating media guide member.

According to these and other objects of the present invention, a printer has (1) a support shoe with a cylindrical inner surface and (2) a write head carried by a rotor which is simultaneously rotatable about and linearly translated along the axis of the cylindrical surface. A media guide member is mounted for movement along the axis of rotation of the rotor. The media guide member is moved to a position within the cylindrical inner surface of the support shoe so as to form a gap between the inner surface of the support shoe and the outer surface of the media guide member. The recording media can advance around a gap formed between the outer surface of the media guide member and inside of the cylindrical inner surface of the support shoe.

According to a preferred embodiment of the present invention, the rotor is carried by a rotor support member in fixed spacial relationship to the media guide member for simultaneous linear translation along the axis of rotation of the rotor. The rotor support member is attached to a carriage assembly which is supported for movement along a pair of guide rods. The media guide member may include a plurality of rollers which define the outer surface and which, with the inner surface of the support shoe, form the gap in which the media can advance. Alternatively, the media guide member may be a disk with an outer circumference which defines the outer surface and which, with the inner surface of the support shoe, form the gap in which the media can advance. Preferably, the media guide member aligns along the fixed axis near the cross-track center of media as media advances in the gap.

The invention, and its objects and advantages, will become more apparent in the below description of the preferred embodiments.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
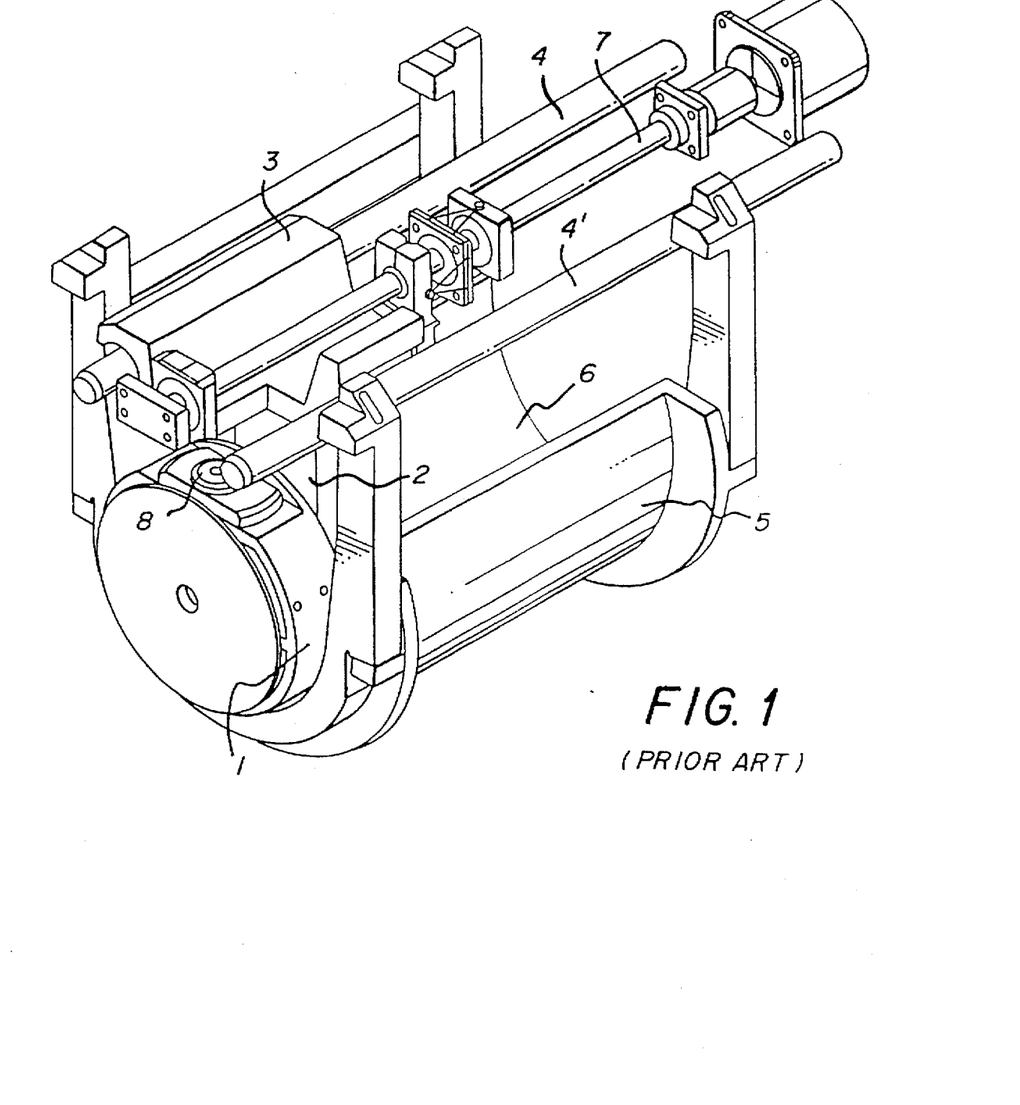
FIG. 1 a perspective view of a rotary printing system according to the prior art.

A rotary printing system employing a multi-position lens assembly is illustrated in FIG. 1, and includes a rotor 1 coupled to a drive motor, not shown, supported by a rotor support member 2 which hangs from a carriage assembly 3 which is supported for movement along a pair of guide rods 4 and 4'. The rotor is arranged to spin and move axially within a cylindrical support shoe 5 which is provided with a sheet of photosensitive material on the inner surface 6 thereof. Rotor 1 is attached to a linear translation assembly comprising rotor support member 2, carriage assembly 3, and a lead screw 7 driven by a stepper motor. See commonly assigned, co-pending U.S. patent application Ser. No. 08/123,838 entitled LEADSCREW COUPLER, filed in the names of Jadrich et al. on Sep. 20, 1993. The rotor is simultaneously rotated by the drive motor in a fast scan direction and is translated past the cylindrical support shoe in the slow scan direction (axially) by the stepper motor and lead screw 7, thereby achieving a raster scan pattern on the photosensitive media held within the support shoe.

An LED printhead assembly 8 is mounted in rotor 1 and comprises a plurality of mono-color light sources such as an array of LED's and a projection lens assembly. The printhead assembly is located within the body of rotor 1 with the LED array package positioned so that the LED aperture output surface is located in a plane which is perpendicular to the optical axis of the projection lens assembly. The projection lens assembly is arranged to simultaneously image (focus) all of the LED's in the array onto a surface located in close proximity above the outer surface of the rotor, and more particularly, onto the inner surface of the photosensitive material held by support shoe 5. A single projection lens array thereby images the plurality of LED's onto the photosensitive material as a plurality of individual images which constitute the writing beams that expose the image pixels. Additional details of the LED array and the generation of pixel control signals can be found in afore-mentioned U.S. patent application Ser. No. 08/123,839.

Paper Loading

Figure 2:
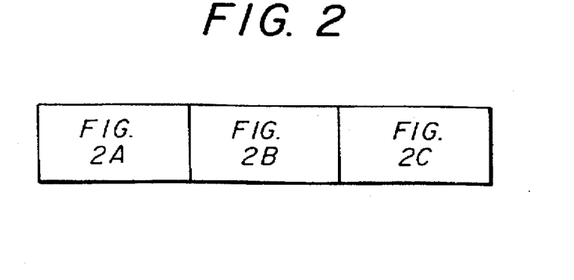
FIG. 2 shows the correct alignment of the drawing sheets of FIGS. 2A–2C.
Figure 2A:
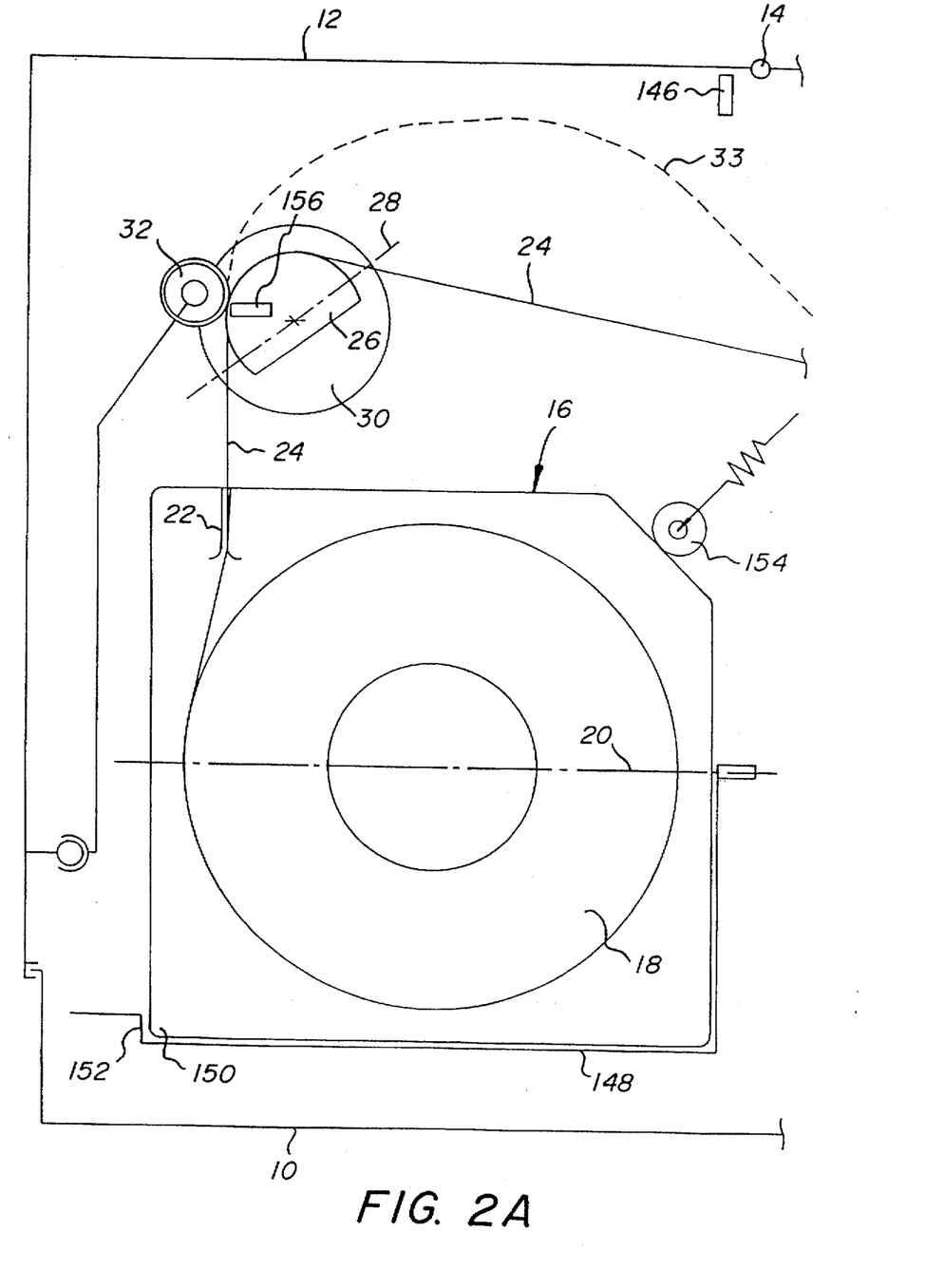
FIGS. 2A–2C collectively depict a general schematic illustration of apparatus according to a first preferred embodiment of the present invention.

Referring to FIG. 2A, access into a light-tight cabinet 10 is attained through a door 12, which pivots about a hinge 14. A light-tight cassette 16 houses a roll 18 of photographic light sensitive media. Cassette 16 pivots about an axis 20. A flock-lined slit 22 in cassette 16 allows egress of media 24. Media 24 is fed around a shoe 26 made from a material with a low co-efficient of friction such as Delrin AF.

Shoe 26 is allowed to pivot, that is, gimbal, about an axis 28. At the far end of shoe 26 is a rotatable flange which serves as an edge guide 30 against which media 24 abuts during transport. An anti-backup roller 32, which is further described in my commonly assigned, co-pending U.S. patent application Ser. No. 08/371,346, entitled PRINTER WITH SUPPORT SHOE AND MEDIA METERING THEREIN, filed concurrently herewith; the disclosure of which is specifically incorporated herein by reference. Anti-backup roller 32 is pivotally mounted to light-tight door 12. When door 12 is closed, anti-backup roller 32 urges media 24 against shoe 26. Anti-backup roller 32 also urges media 24 towards edge guide 30 as media 24 is advanced, as described below.

Paper Advance

Figure 2B:
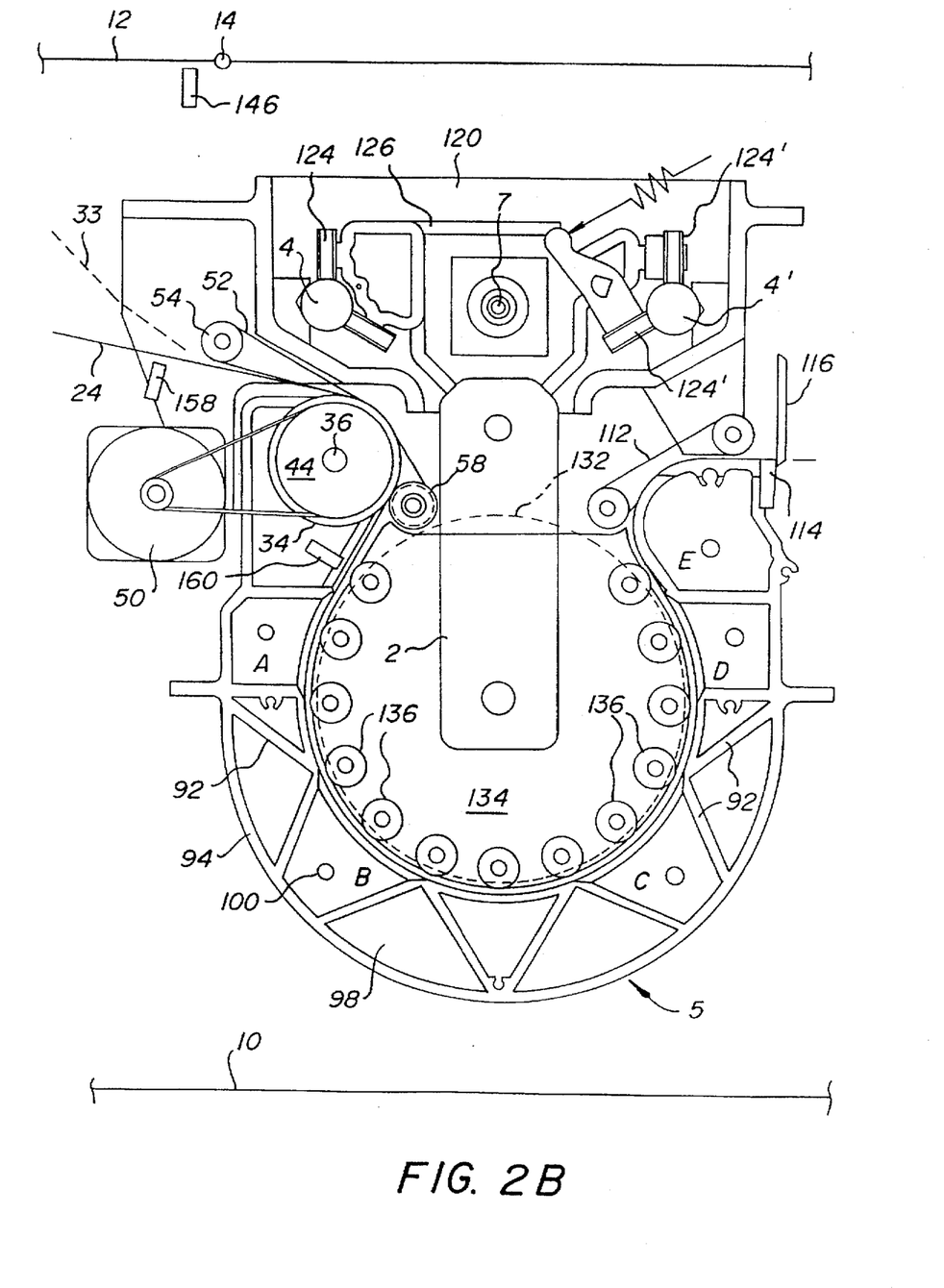
Figure 3:
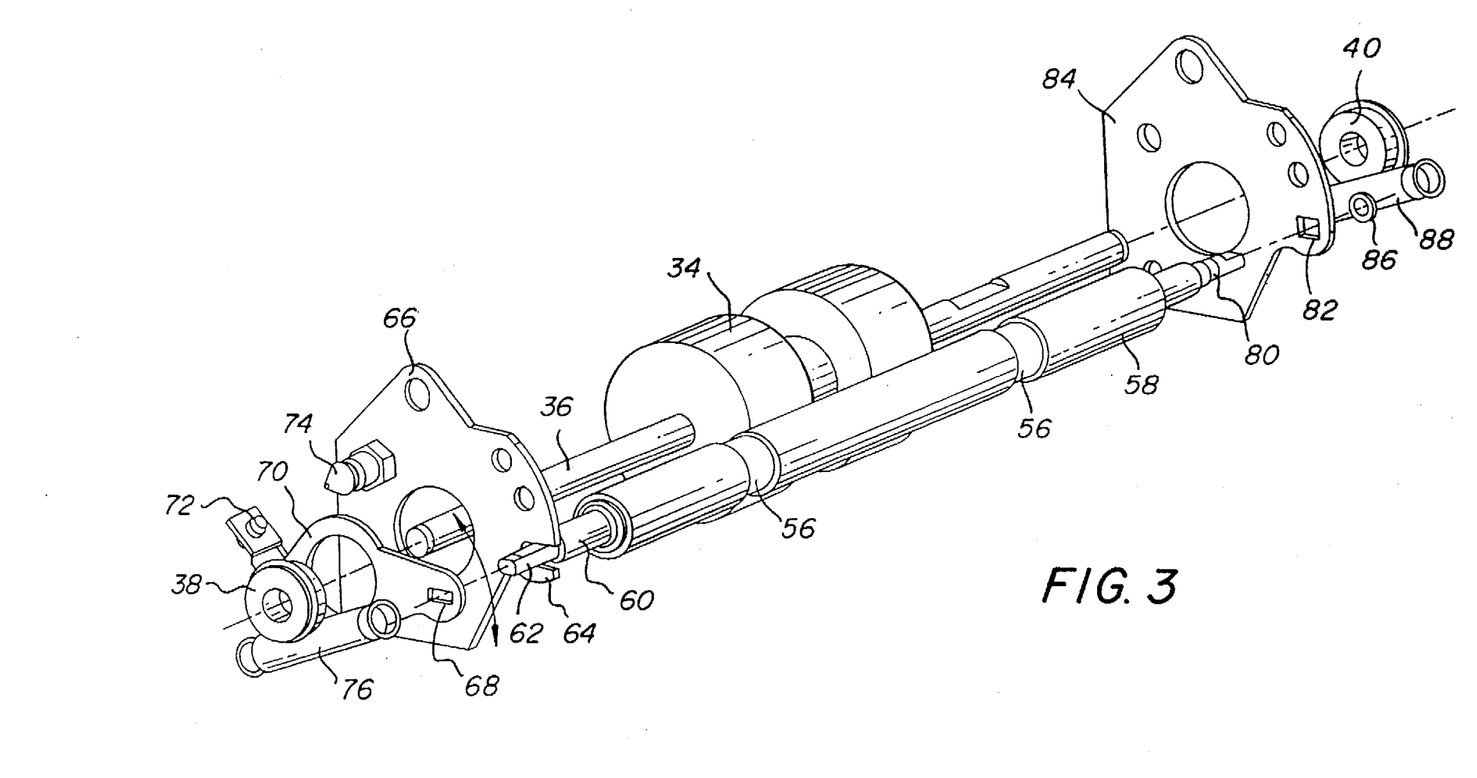
FIG. 3 is a view of the metering roller/pressure roller interface and adjustment means.
Figure 4:
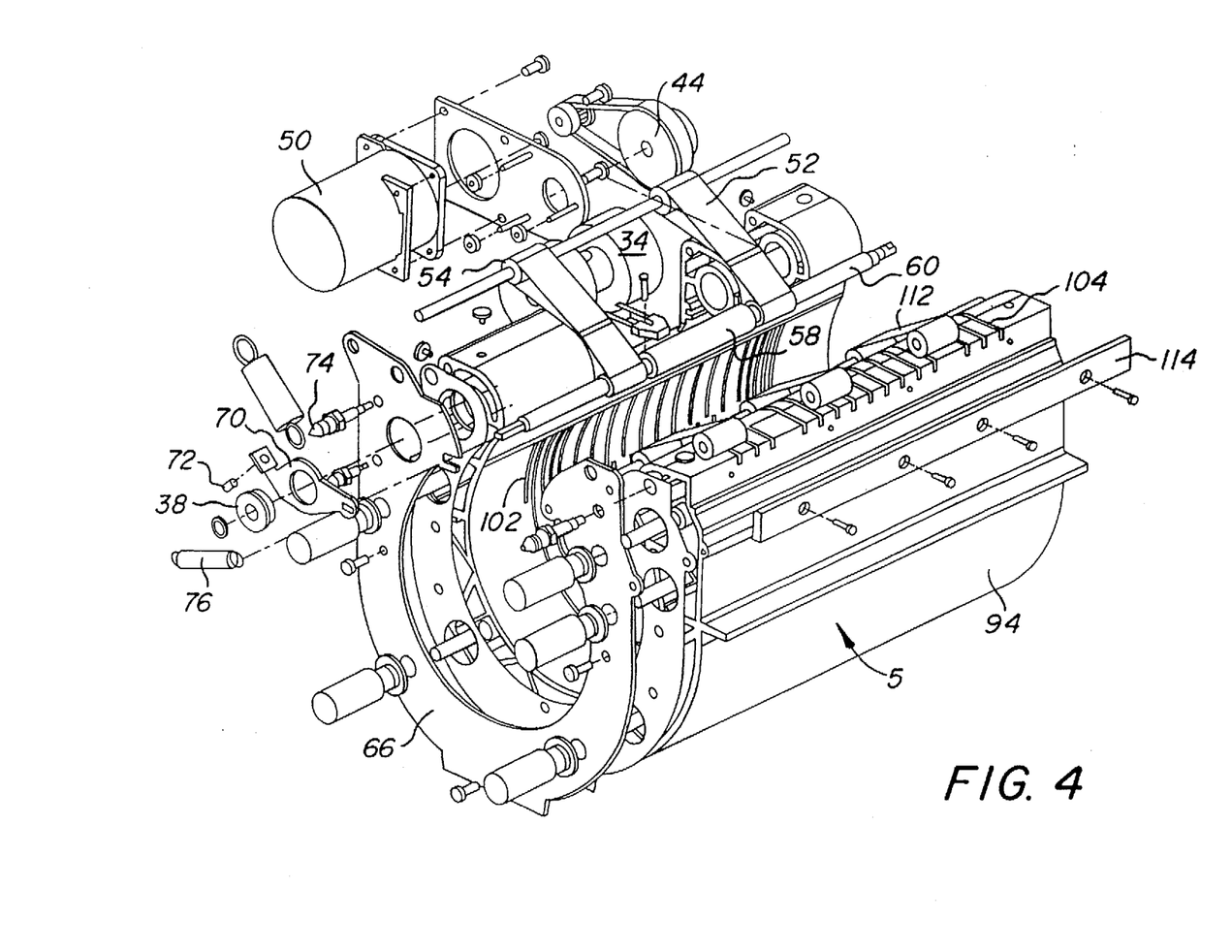
FIG. 4 is an exploded assembly view of the apparatus shown in FIG. 2B.

From shoe 26, paper is lead to a metering mechanism illustrated in detail in FIGS. 2B, 3, and 4. A metering roller 34, with a covering of a material with a high coefficient of friction such as urethane, is supported on a metering roller shaft 36 by bearings 38 and 40. At the end of shaft 36 is a pulley 44 which is rotatably driven by a stepper motor 50 which responds to control signals from a stepper motor driver circuit, not shown.

Situated about metering roller 34 is a series of pliable media guide belts 52 which are rotatably, but not drivenly, mounted to a corresponding set of guide belt pulleys 54. Media guide belts 52 also loop around grooves 56 located on a pressure roller 58, the outer diameter of which has a low coefficient of friction coating, such as for example Delrin AF or anodized aluminum. Pressure roller 58 urges media 24 into contact with metering roller 34.

Pressure roller 58 is rotatably mounted on a pressure roller shaft 60, one end of which has a flat 62 that is pivotally limited by a slot 64 in an end cap 66 of cylindrical support shoe 5. Flat end 62 is further captured in a slot 68 in an adjustment plate 70. Adjustment plate 70 is rotatably arranged about bearing 38 for metering roller shaft 36. Adjustment is made by turning a set screw 72 which impinges on a stop 74 located on cylindrical support end cap 66. A spring 76 is arranged to bias flat end 62 against slot 68, to urge pressure roller 58 into metering roller 34, and to keep set screw 72 against stop 74. Adjustability is provided so that the axes of pressure roller 58 and metering roller 34 can be made parallel during assembly. The adjustment and exact constraint of pressure roller 58 maintains the nip between metering roller 34 and pressure roller 58 in an axially parallel condition regardless of forward or backward metering direction. Flat 62 and slot 68 interface keeps shaft 60 from rotating during metering.

On the other end of pressure roller shaft 60, a round 80 is loosely captured by slot 82 in cylindrical support end cap 84. The round end is axially held by a retaining ring 86. A spring 88 is arranged to bias round end 80 against a flat edge of slot 82, and to urge pressure roller 58 into metering roller 34.

As shown in FIG. 2B, media 24 is fed between metering roller 34 and media guide belts 52, causing media 24 to be drawn into the nip between metering roller 34 and pressure roller 58. The arrangement of these rollers is such that, when media 24 leaves the roller nip, the media is essentially tangent to the leading edge of cylindrical support shoe 5.

Cylindrical Support Shoe

Referring to FIGS. 2B and 4, cylindrical support shoe 5 is constructed so that numerous intermediate walls 92 and an outer wall 94 form individual triangularly-shaped manifold chambers A, B, C, D, and E, and non-manifold chambers 98, all of which contribute substantially to the self-rigidity of cylindrical support shoe 5. Two end caps (only end cap 66 is shown in FIG. 4) are secured at each end of support shoe 5 and have holes 100 opening onto manifold chambers A to E, to which are attached means to selectively connect a vacuum source, not shown.

The arcuate inner surface of cylindrical support shoe 5 is precisely bored so that illumination means, not shown, mounted on the rotor focus on the emulsion side of media 24. The arcuate inner surface and bores for metering roller shaft 36 are bored on the same fixture so that their axes are parallel with each other. The arcuate inner surface of support shoe 5 has radial slots, best seen in FIG. 4, which communicate the vacuum distributed by manifold chambers A to E to the back side of media 24. The vacuum intimately holds media 24 to the arcuate inner surface. The trailing edge of the arcuate inner surface is tangent to essentially cylindrical manifold chamber E, which is provided with radial slots to communicate the vacuum distributed by manifold chamber E to the back side of media 24.

A second set of media guide belts 112, rotatably supported, but not driven by, guide belt pulleys, serve to guide media 24 around cylindrical manifold chamber E. A first cutting edge 114 of a knife is attached to cylindrical support shoe 5. A second cutting edge 116 is slidably mounted to impinge upon first cutting edge 114 to thereby create knife means to separate a media sheet from media web 24.

Carriage Assembly

A translator base assembly 120 is attached via vibration absorbing mounts, not shown, to the framework of the light-tight cabinet 10 and supports guide rods 4 and 4'. Two sets of wheels 124 and 124' are rotatably attached to a carriage 126 which translates along guide rods 4 and 4' by means of lead screw 7 turned by a lead screw motor, not shown. See afore-mentioned U.S. patent application Ser. No. 08/123,838 entitled LEADSCREW COUPLER, now U.S. Pat. No. 5,392,662. Rotor support member 2 is rigidly attached to carriage 126, and carries a rotor 132 depicted by the dashed circle upon which is mounted the illumination means, not shown. Also attached to rotor support member 2 is a media guide member 134 that carries a plurality of rollers 136 angularly distributed around the periphery of media guide member 134. Rollers 136 are made from a lubricious material such as Delrin so as to be self lubricating and of low inertia, and are arranged such that a space gap is created between the outer diameter of rollers 136 and arcuate inner surface 6. The space gap is larger in diameter than rotor 132 so as to prevent media 24 from encountering rotor 132 during media transport operation or rotor translation.

Sheet Media Transport

Figure 2C:
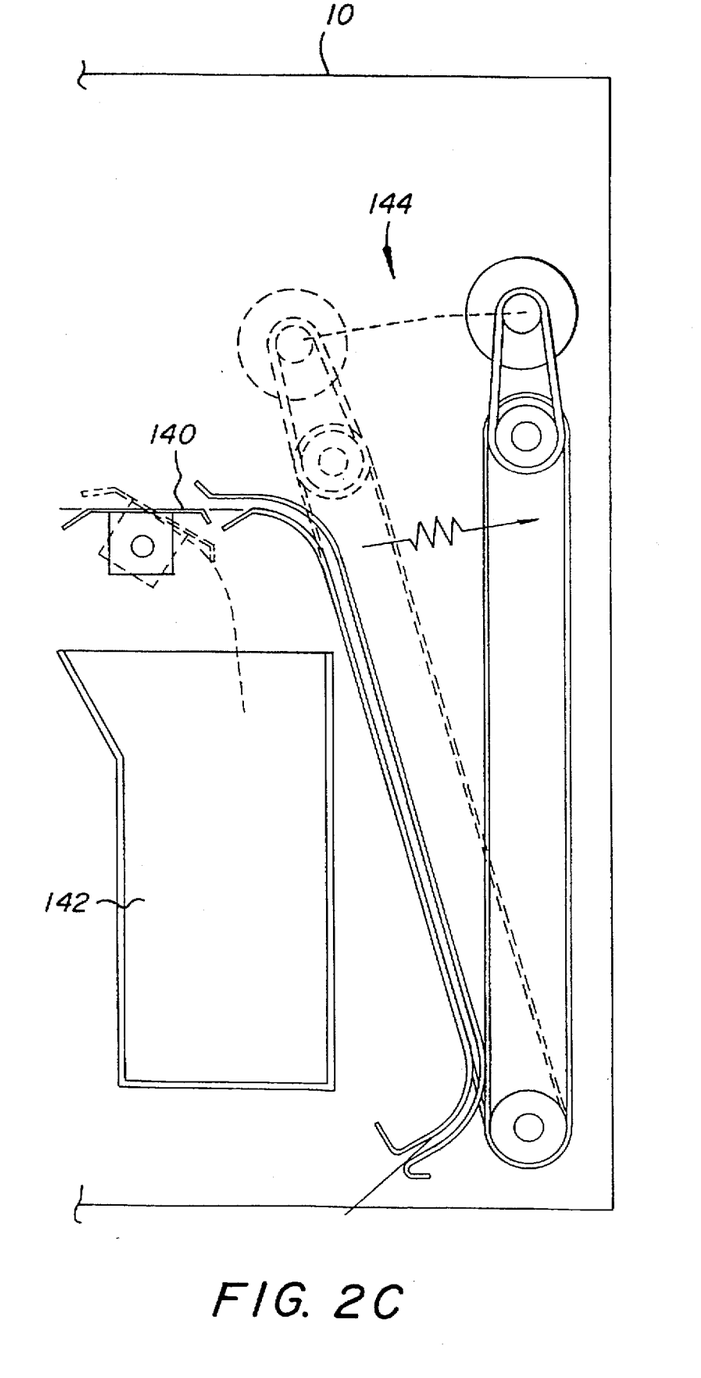

Referring now to FIG. 2C, media exiting knife means 114, 116 is directed by a deflector 140 either to a waste container 142 or to the entry of a media transport assembly 144, which is better described in my commonly assigned co-pending U.S. patent application Ser. No. 08/371,347; entitled PRINTER WITH SUPPORT SHOE AND EXIT MEDIA GUIDE MEMBER, and filed concurrently herewith; the disclosure of which is specifically incorporated herein.

Operation

Roll 18 of photographic light-sensitive media is loaded in cassette 16 in the dark so as not to expose the emulsion. A leader is fed through flock-lined slit 22. Light-tight door 12 is opened which defeats an interlock 146 (FIG. 2B) electrically disconnect power to rotor 132 and to a carriage motor, not shown. Cassette 16 is then placed inside a cassette pan 148 (FIG. 2A) and urged inwards until a lip 150 of the cassette engages with a front lip 152 of pan 148. This engagement is maintained by a spring driven roller 154. An exposed leader of media 24 is pulled from the cassette, dressed over shoe 26, and urged into a guide way formed by media guide belt 52 and metering roller 34. A sensor means 158 signals the presence of media 24 in its location and signals metering roller 34 to drive in a clockwise direction. This has the effect of drawing media 24 into the nip between metering roller 34 and pressure roller 58. A second sensor means 160 is located downstream of the roller nip and turns off drive signals to metering roller 34 when the leading edge of media 24 is present. When light-tight door 12 is closed, anti-backup roller 32 urges media 24 against shoe 26, and power is initiated to the system as interlock 146 is closed.

Because the leader of media 24 has been exposed, it must be removed prior to initiating a print cycle. Carriage 126, carrying rotor support member 2 and rotor 132, is caused to translate along guide rods 4 and 4' until media guide member 134 is at a point approximately midway down the axis of the arcuate inner surface of support shoe 5.

Generally, it would be desirable to keep rotor 132 spinning during the loading process, but not emitting exposing illumination. Metering roller 34 is rotated by stepper motor 50 in response to control signals which causes media 24 to be driven into the space gap created by rollers 136 of media guide member 134 and the cylindrical support surface of support shoe 5. As media 24 is fed through the space gap, lateral biasing action of anti-backup roller 32 urges media 24 into edge guide 30 (FIG. 2A) to provide a lateral constraint. Media 24 is angularly constrained by metering roller 34. Thus, the unconstrained leader end of media 24 will steer itself to a condition perpendicular to the axis of metering roller 34. At the end of the arcuate inner surface, media 24 is urged between the second set of media guide belts 112 and cylindrical manifold chamber E, and then past knife cutting edge 114. As media 24 is translating along the arcuate inner surface, diverter 140 (FIG. 2C) is pivoted to the position shown by the broken lines. Media 24 is deflected towards waste container 142 as it is driven for a predetermined distance, dependent upon the number of stepping signals given to metering roller stepper motor 50.

Application of Vacuum

When stepper motor 50 stops driving, vacuum is applied to manifold chamber C. This has the effect of drawing media 24 away from chambers A, B, D, and E as media 24 immediately adjacent chamber C is drawn into intimate contact with the arcuate inner surface, thus removing most of the slack in the segment of media 24 between metering roller 34 and chamber C. Vacuum is then applied to chamber A, which causes the media segment to become taut and in intimate contact with the arcuate inner surface. Vacuum to chamber C is then turned off. Vacuum to chamber B is initiated, then C, then D, then E. The sequential actuation of the chambers forces media 24 to wrap around arcuate inner surface 6 from metering roller 34 to first knife cutting edge 114, pushing air ahead of it. The "wiping" action prevents air bubbles from forming between the arcuate inner surface and the back surface of media 24.

Cutting

Knife cutting edge 116 is then slidably actuated to impinge upon and rotate about first cutting edge 114. This separates media 24 into a small sheet, which falls into waste container 142. Vacuum is discontinued to all chambers A to E, releasing the intimate bond to the arcuate inner surface of support shoe 5. Metering roller 34 is then driven another predetermined number of steps and the vacuum sequence described above is again initiated and followed by operation of the knife means. This occurs until all that portion of media 24 which was exposed during the loading operation is in waste container 142.

When all exposed leader media is parted from media web 24, diverter 140 is de-energized, allowing it to pivot to the position shown by the solid lines in FIG. 2C. Metering roller 34 is driven counter-clockwise the number of steps that corresponds to the arcuate length between cutting edge 114 and the end of the arcuate inner surface. As the media is driven in this reverse direction, a slack loop 33, depicted by dashed line in FIGS. 2A and 2B, is formed in the media between the entrance to metering roller 34 and the interface between gimbal shoe 26 and anti-backup roller 32. Space is provided within light-tight cabinet 10 for this purpose.

A sequential vacuum is then applied in the manner described above. That is, first C, then A, etc. Carriage 126 is driven by lead screw 7 so that illumination means on rotor 132 are aligned with the edge of media 24 in the arcuate inner surface. Printing now occurs by moving carriage 126 down rods 4 and 4' while rotor 132 spins with the illumination means precisely exposing media 24 in response to signals delivered from image storage means, not shown.

At the conclusion of exposure, carriage 126 is caused to translate in a reverse direction along guide rods 4 and 4' until media guide member 134 is at a point approximately midway down the length of the arcuate inner surface axis. Vacuum is discontinued so media 24 can be moved. Metering roller 34 is driven so that the edge of media 24 crosses the top of diverter 140 and enters a space gate at entrance to media transport assembly 144. When media 24 has been driven into the space gate, the appropriate number of steps that corresponds to the image length plus the arcuate length between end of arcuate support 106 and cutting edge 114, vacuum is again sequentially initiated and the exposed portion is cut with knife means 114, 116, as described in my afore-mentioned U.S. patent application entitled PRINTER WITH SUPPORT SHOE AND EXIT MEDIA GUIDE MEMBER.

Preferably, the image is over-written to assure that the image fills the exposable surface of media 24. Thus, vacuum is discontinued and media 24 is advanced a small number of steps corresponding to the over-written portion plus a minimal buffer amount to provide an unexposed edge for the ensuing print. Vacuum is drawn as stated above, and the over-write portion is severed from the web of media 24 by knife means 114, 116. The severed, unexposed edge is small enough to fit between knife means and diverter 140, so diverter 140 need not be actuated for the over-written portion to fall into waste container 142.

Vacuum is again released, and media of a length corresponding to the distance between end of the arcuate inner surface and cutting edge 114 is again withdrawn onto the arcuate inner surface. Vacuum is re-applied in the manner described above and the ensuing exposure is made.

When all of media 24 has been used, the situation is detected by an absence of media 24 at sensor 156, and appropriate signals are generated to alert the operator to the condition.

Summary of the Print Cycle of the First Embodiment

Media guide member 134 is moved to the axial center of support shoe 5 and the leading edge of media web 24 is loaded into the nip of pressure roller 58 and metering roller 34. The web is moved past knife cutting edges 116 and 118 with deflector 140 in its dotted line position. Anti-backup roller 32 forces the web into lateral constraint edge guide 30.

Vacuum is applied to hold the web to the shoe surface while an exposed portion of the web is trimmed. The vacuum is released, the web moved again, vacuum is re-applied, and another exposed portion of the web is trimmed. This is repeated until all exposed web has been removed.

Now, the vacuum is turned off and the web is moved back into the shoe past a "print" position. The web is moved forward in the shoe to its "Print" position, and vacuum is applied and deflector 140 is returned to its illustrated full line position.

Media guide member 134 is moved with the rotor while the media is exposed by printhead assembly 8. When the media guide member is returned to the middle of the web, the vacuum is released and sheet transport assembly 144 is opened. The web is advanced to the sheet transport assembly until the trailing edge of the exposed portion of the media is at knife cutting edges 114, 116. Vacuum is applied before the web is cut.

The cut sheet is driven down transport assembly 144 to a film processor, not shown, and the process is repeated for the next exposure.

Figure 5:
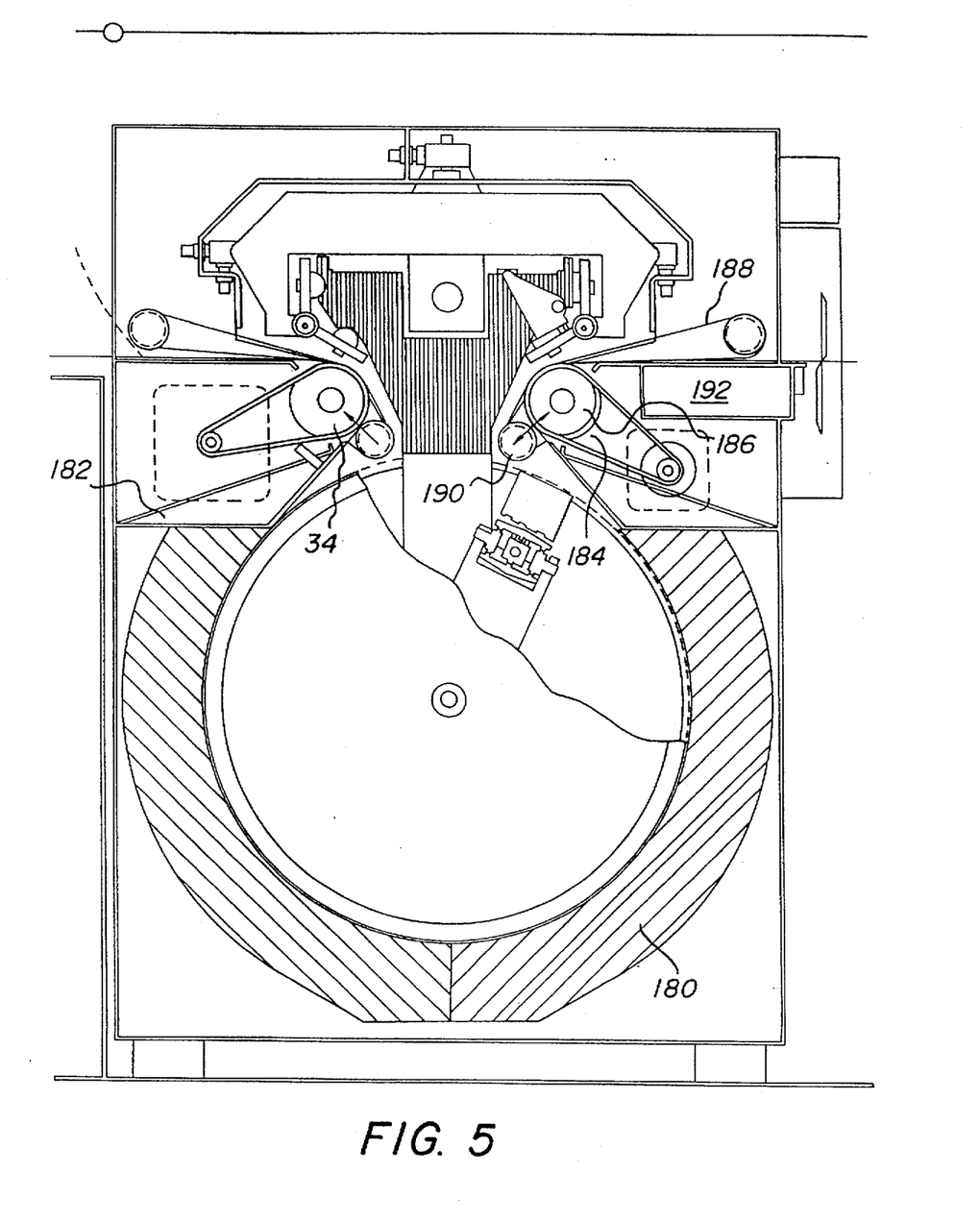
FIG. 5 is a schematic illustration similar to FIG. 2B, showing another preferred embodiment of the present invention.

FIG. 5 is a view similar to FIG. 2B, showing another preferred embodiment of the present invention. The two embodiments are generally quite similar, but there are several distinctions to be noted herein. Specifically, the embodiment of FIG. 5 includes a cast or fabricated support shoe 180 rather than the extruded support shoe 5 of the first embodiment. Support shoe 180 includes a series of, say, two vacuum chambers (not shown) and an entrance chamber 182 with a series of perforations to communicate vacuum from the interior of the entrance chamber to the back side of the media.

Also of note, the embodiment of FIG. 5 includes an exit roller mechanism 184 similar to the entrance roller 34 mechanism. The exit roller mechanism includes a driven roller 186 with a low coefficient of friction covering, a series of belts 188, and a movable pressure roller 190 which opens and closes the nip with exit roller 186. The embodiment of FIG. 5 is suitable for use with larger format media than is the first embodiment; the exit roller mechanism being better at controlling movement of wider web. A vacuum box 192 provides the web control that was presented by chamber E of the first embodiment.

The invention has been described in detail with particular reference to preferred embodiments thereof, but it will be understood that variations and modifications can be effected within the spirit and scope of the invention.

What is claimed is:

1. A printer having a support shoe with an at-least-partially cylindrical inner surface for receiving a light-sensitive recording media, a rotor which is simultaneously rotatable about and linearly translated along a fixed axis, a write head assembly carried by the rotor to expose recording media received on the inner surface of the support shoe; said printer further comprising:

a rotor support member mounted for movement in a direction parallel to the fixed axis of rotation of the rotor; and a media guide member having an outer surface, the media guide member being carried by the rotor support member for movement to a position within the cylindrical inner surface of the support shoe so as to form a gap between the inner surface of the support shoe and the outer surface of the media guide member, in which gap, recording media can advance around the outer surface of the media guide member and inside of the cylindrical inner surface of the support shoe.

2. A printer as set forth in claim 1 wherein the rotor is carried by the rotor support member in fixed spatial relationship to the media guide member for simultaneous linear translation along the axis of rotation of the rotor.

3. A printer as set forth in claim 1 wherein the rotor support member is attached to a carriage assembly which is supported for movement along a pair of guide rods.

4. A printer as set forth in claim 1 wherein the media guide member includes a plurality of rollers which define the outer surface and which, with the inner surface of the support shoe, form the gap in which the media can advance.

5. A printer as set forth in claim 1 wherein the rotor has smaller radius than the outer surface of the media guide member.

6. A printer as set forth in claim 1 wherein the media guide member is at least one disk with an outer circumference which defines the outer surface and which, with the inner surface of the support shoe, form the gap in which the media can advance.

7. A printer as set forth in claim 6 wherein the at least one disk is rotatable about the fixed axis.

8. A printer as set forth in claim 1 wherein the media guide member aligns along the fixed axis near a cross-track center of media as media advances in the gap.

* * * * *